United States Patent [19]

Nakatani et al.

[11] 4,420,304

[45] Dec. 13, 1983

[54] APPARATUS FOR MANUFACTURING RAPIDLY COOLED SOLIDIFIED SLAG

[75] Inventors: Genji Nakatani; Kazuo Kanai; Haruo Itoh; Yasuto Takasaki; Kenji Ohkoshi; Yoshinobu Yanagida, all of Fukuyama, Japan

[73] Assignee: Nippon Kokan Kabushiki Kaisha, Tokyo, Japan

[21] Appl. No.: 339,143

[22] Filed: Jan. 13, 1982

[30] Foreign Application Priority Data

Jan. 30, 1981 [JP] Japan .................................. 56-12778

[51] Int. Cl.³ ...................... F27D 15/02; F28D 11/02; C21B 3/06
[52] U.S. Cl. ........................................ 432/83; 165/90; 165/91; 266/201
[58] Field of Search .................... 432/77, 83; 266/201; 165/90, 91

[56] References Cited

U.S. PATENT DOCUMENTS

| 1,740,064 | 12/1929 | Boertlein | 165/91 |
| 3,187,809 | 6/1965 | Spears | 165/90 |
| 4,050,884 | 9/1977 | Jablin | 432/29 |
| 4,330,264 | 5/1982 | Konishi et al. | 432/77 |

FOREIGN PATENT DOCUMENTS

| 2406377 | 5/1979 | France . |
| 2078708 | 1/1982 | United Kingdom . |
| 2078709 | 1/1982 | United Kingdom . |

*Primary Examiner*—John J. Camby

*Attorney, Agent, or Firm*—Frishauf, Holtz, Goodman & Woodward

[57] ABSTRACT

An apparatus for manufacturing a rapidly cooled solidified slag, which comprises: a pair of cooling drums, the peripheral surfaces of said pair of cooling drums being in contact with each other and rotating in directions opposite to each other at the same peripheral speed; a pair of weirs provided at the both ends of said pair of cooling drums so as to be in contact with the both ends of said pair of cooling drums, said pair of weirs forming a slag sump in cooperation with the upper half of the peripheral surface of each of said pair of cooling drums, and a molten slag being poured into said slag sump; a pair of gas nozzles provided adjacent the peripheral surface of each of said pair of cooling drums, said pair of gas nozzles uniformly ejecting a gas onto the molten slag, which has been deposited on the surface of said pair of cooling drums in said slag sump, to blow part of said molten slag back into said slag sump, thereby uniformly reducing the thickness of said molten slag deposited on the peripheral surface of said pair of cooling drums; a cooling medium for cooling said pair of cooling drums, said cooling medium being supplied to each of said pair of cooling drums, and exchanging heat with said molten slag deposited on the peripheral surfaces of said pair of cooling drums, whereby said molten slag becomes a rapidly cooled solidified slag through heat exchange with said cooling medium, and is peeled off from the peripheral surfaces of said pair of cooling drums by means of a scraper.

4 Claims, 11 Drawing Figures

APPARATUS FOR MANUFACTURING RAPIDLY COOLED SOLIDIFIED SLAG

Reference To Patents, Applications And PUBLICATIONS PERTINENT TO THE INVENTION U.S. Pat. No. 4,050,884 dated Sept. 27, 1977.

The contents of the prior art disclosed in the above-mentioned prior document will be discussed under the heading of the "BACKGROUND OF THE INVENTION" presented hereinafter.

FIELD OF THE INVENTION

The present invention relates to an apparatus for manufacturing a rapidly cooled solidified slag, which permits manufacture of a rapidly cooled solidified slag at a very high productivity.

BACKGROUND OF THE INVENTION

Molten slags include, for example, molten blast furnace slag, molten converter slag, and molten electric furnace slag. It has been known that it is possible to obtain a rapidly cooled solidified slag by cooling a molten slag at a high cooling rate for solidification. The rapidly cooled solidified slag having a high vitrification ratio thus obtained is suitable, for example, as a cement material (extending agent).

Figures 1, 4:
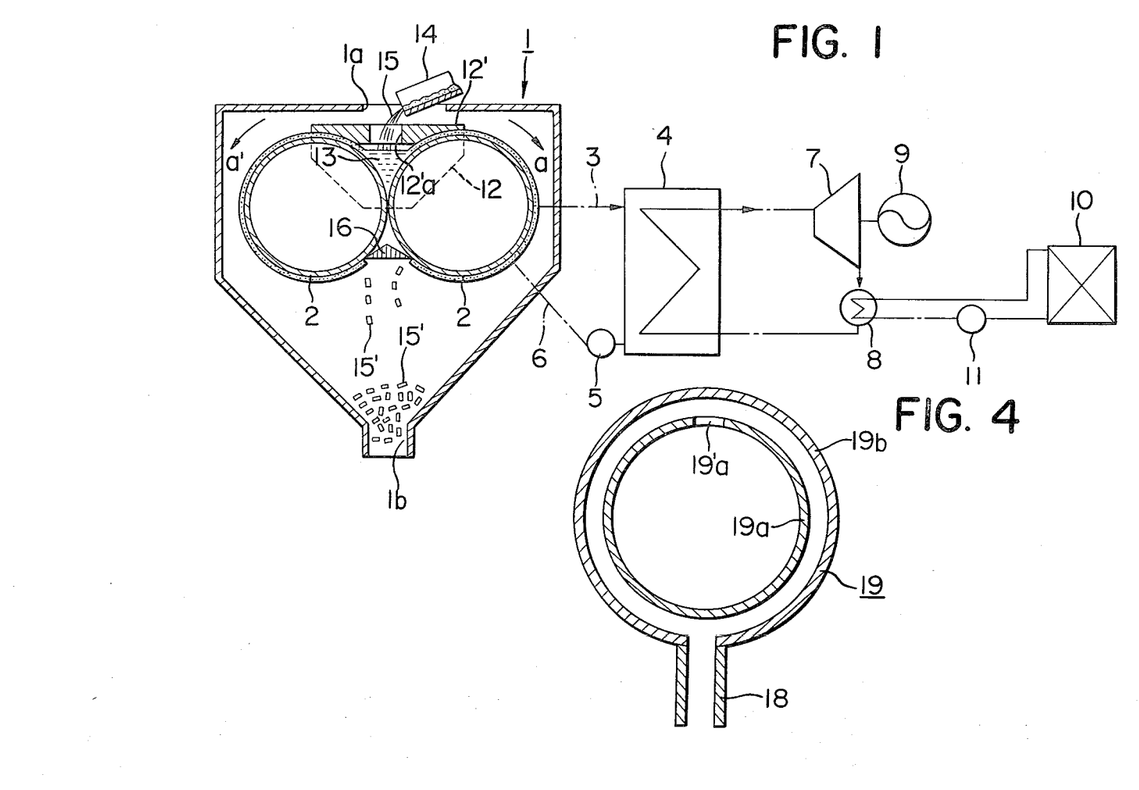
FIG. 1 is a schematic sectional view illustrating an embodiment of the conventional apparatus for manufacturing a rapidly cooled solidified slag.
FIG. 4 is a sectional view illustrating an embodiment of the gas nozzle of the present invention.

FIG. 1 shows an apparatus for manufacturing a rapidly cooled solidified slag, which is partially different from but substantially the same as the apparatus for manufacturing a rapidly cooled solidified slag disclosed in the U.S. Pat. No. 4,050,884 dated Sept. 27, 1977. More specifically, FIG. 1 is a schematic sectional view illustrating an embodiment of the apparatus for manufacturing a rapidly cooled solidified slag. In FIG. 1, 1 is an enclosed-structure housing. The housing 1 has an opening 1a at the top thereof for passing a molten slag, and a discharge port 1b at the lower end thereof for discharging a crushed rapidly cooled solidified slag. In the housing 1, a pair of cooling drums 2 each having the same diameter and the same length are arranged so that the axial directions thereof are parallel to each other in the same horizontal plane. Each of the pair of cooling drums 2 is rotated by a suitable driving means (not shown) in directions opposite to each other at the same peripheral speed, as shown by the arrows "a" and "a'" in FIG. 1, in the rising direction of the peripheral surface of each of the pair of cooling drums 2 at the contact portion thereof. A plurality of cooling through-holes (not shown) are pierced in the peripheral wall of each of the pair of cooling drums 2 in the axial direction thereof. One end of each of the plurality of cooling through-holes communicates with a hollow portion (not shown) of one end of the center axle of the cooling drum 2, and the other end of the cooling through-holes communicates with a hollow portion (not shown) of the other end of the center axle of the cooling drum 2. The hollow portion of the above-mentioned one end of the center axle of the cooling drum 2 is liquid-tightly connected to one end of a pipe 3 through a swivel joint (not shown). An end of another pipe 6 provided with a pump 5 on the way is connected to the outlet of the heat absorbing section of a heat exchanger 4. The other end of the pipe 6 is liquid-tightly connected to the hollow portion of the other end of the center axle of the cooling drum 2 through another swivel joint (not shown). In FIG. 1, one heat exchanger 4 is shown to be connected to one of the cooling drums 2, however, another heat exchanger not shown is also connected to the other one of the cooling drums 2 in the same way as mentioned above. And, a cooling medium for cooling the cooling drum 2 is supplied to the plurality of cooling through-holes of the peripheral wall of the cooling drum 2 through the pipe 6 and the center axle of the cooling drum 2 by means of the pump 5. The cooling medium supplied to the plurality of cooling through-holes is heated as described later by means of the heat contained in the molten slag which is deposited on the peripheral surface of the cooling drum 2, and supplied to the heat absorbing section of the heat exchanger 4 through the center axle of the cooling drums 2 and the pipe 3 while partially generating steam. The cooling medium supplied to the heat absorbing section of the heat exchanger 4 is cooled through heat exchange in the heat exchanger 4 with water supplied to the radiator section thereof. The cooling medium cooled in the heat absorbing section of the heat exchanger 4 is suppled again into the plurality of cooling through-holes in the peripheral wall of the cooling drum 2 through the pupe 6 by means of the pump 5. Thus, the cooling medium circulates through the cooling drum 2 and the heat exchanger 4. On the other hand, the steam obtained in the radiator section of the heat exchanger 4 through heat exchange with the cooling medium flowing in the heat absorbing section of the heat exchanger 4 is fed to the turbine 7 to drive the same, then fed to the condenser 8 to become water, and then supplied again to the radiator section of the heat exchanger 4. In FIG. 1, 9 is an electric power generator driven by the turbine 7, 10 is a cooling tower for cooling the cooling water for the condenser 8, and 11 is a pump for causing the cooling water for the condenser 8 to circulate through the cooling tower 10 and the condenser 8.

As shown in FIG. 1, a pair of weirs 12 are provided in the upper halves of the both ends of each of the pair of cooling drums 2 so as to be in contact with the both ends of each of the pair of cooling drums 2 (FIG. 1 shows only one of the pair of weirs 12). The top ends of each of the pair of weirs are connected to each other by a cover 12' which has an opening 12'a at the center thereof. The pair of weirs 12 and the single cover 12' are supported on the housing 1 by means of a suitable supporting means not shown. A slag sump 13 is formed by the upper half of the peripheral surface of each of the pair of cooling drums 2 in cooperation with the pair of weirs 12. A slag runner 14 for pouring the molten slag 15 into the slag sump 13 is provided above the pair of cooling drums 2. The molten slag 15 from the slag runner 14 is poured through the opening 1a of the housing 1 and the opening 12'a of the cover 12' into the slag sump 13 where a slag pool is formed. The molten slag 15 poured into the slag sump 13 is deposited onto the peripheral surface of each of the pair of cooling drums 2 during rotation thereof, and the molten slag 15 deposited on the peripheral surface of each of the pair of cooling drums is converted into a rapidly cooled solidified slag through heat exchange with a cooling medium passing through the plurality of cooling through-holes in the peripheral wall along with the rotation of each of the pair of cooling drums. The cooling medium supplied to the plurality of cooling through-holes in the peripheral wall of the pair of cooling drums 2 is heated by the molten slag 15 deposited on the peripheral surface of each of the pair of cooling drums 2. When the rapidly cooled solidified slag 15' reaches the lower half of each of the pair of cooling drums 2 along with the rotation of each of the pair of cooling drums 2, the rapidly cooled solidified slag 15' on the peripheral surfaces of the cooling drums 2 is peeled off therefrom, while being crushed by a scraper 16 supported on the housing 1 by means of a suitable supporting means (not shown), and drops into the lower part of the housing 1. A suitable opening and closing means not shown in provided in a discharging port 1b of the lower part of the housing 1. The peripheral surface of each of the pair of cooling drums 2 from which the rapidly cooled solidified slag 15' has been peeled off by the scraper 16 comes again into contact with the molten slag 15 in the slag sump 13 along with the rotation of each of the pair of cooling drums 2, whereby a rapidly cooled solidified slag is continuously manufactured.

According to the above-mentioned apparatus for manufacturing a rapidly cooled solidified slag, it is possible to continuously manufacture a rapidly cooled solidified slag which is free of water and excellent in crushability, and furthermore, to easily recover the heat contained in the molten slag from the cooling medium after heat exchange, since the molten slag deposited on the peripheral surfaces of the pair of cooling drums 2 is subjected to heat exchange with the cooling medium for cooling the pair of cooling drums 2. However, the above-mentioned apparatus for manufacturing a rapidly cooled solidified slag has the following problems:

(1) A rapidly cooled solidified slag may well be manufactured at a high productivity by using cooling drums having a large diameter and rotated at a large number of revolutions. For example, when employing a pair of cooling drums 2 having a diameter of 2,000 mm and a molten blast furnace slag as the molten slag, and rotating this pair of 2,000 mm diameter cooling drums at 3.0 r.p.m., the molten blast furnace slag is deposited into a thickness of from 3.8 to 4.0 mm on the peripheral surfaces of the pair of cooling drums. Along with the rottion of the pair of 2,000 mm diameter cooling drums 2, the molten blast furnace slag deposited on the peripheral surfaces thereof is rapidly cooled, solidified and peeled off therefrom while being crushed by the scraper 16, and is thus converted into a rapidly cooled solidified slag having a vitrification ratio of about 80%. However, the pair of 2,000 mm diameter cooling drums are rotated at revoltions of over 3.0 r.p.m., the thickness of the molten blast furnace slag deposited on the peripheral surfaces thereof becomes slightly larger in response to the increase of the revolutions. In this case, furthermore, the molten blast furnace slag deposited on the peripheral surfaces of the pair of 2,000 mm diameter cooling drums 2 is only partially vitrified, peeled off by the scraper 16 from the peripheral surfaces of the cooling drums 2 before substantial completion of the entire solidification, and drops into the lower part of the hopper 1. As a result, the blast furnace slag partially not as yet solidified which has dropped into the lower part of the hopper 1 is heated at the vitreous portions thereof by its own heat, and becomes thereafter a slow-cooled slag containing very little vitreous portions.

(2) If the thickness of the molten slag 15 deposited on the peripheral surfaces of the pair of cooling drums 2 is large, this impairs the efficiency of heat exchange between the molten slag deposited on the peripheral surfaces of the pair of cooling drums 2 and the cooling medium passing through the pair of cooling drums 2, because of the increased thickness of the heat conducting layer of the deposited slag. (3) The weirs 12 which are supported on the housing 1 are stationary. Therefore, long continuous supply of the molten slag 15 to the slag sump 13 causes the molten slag in the slag sump 13 to be deposited and solidified on the inner surfaces of the weirs 12. As a result, the solidified slag deposited on the inner surfaces of the weirs 12 prevents the molten slag 15 in the slag sump 13 from being deposited on the peripheral surfaces of the pair of cooling drums 2, and impairs smooth rotation of the pair of cooling drums 2.

(4) The weirs 12 are heated by the molten slag 15 in the slag sump 13. However, the weirs 12 are simply in contact with the both ends of the pair of cooling drums 2 so as to prevent the molten slag 15 in the slag sump 13 from flowing out therefrom. Therefore, the heat imparted to the weirs 12 by the molten slag 15 in the slag sump 13 cannot be recovered.

SUMMARY OF THE INVENTION

A principal object of the present invention is therefore to provide an apparatus for manufacturing a rapidly cooled solidified slag, which permits continuous manufacture of a rapidly cooled solidified slag at a very high productivity.

Another object of the present invention is to provide an apparatus for manufacturing a rapidly cooled solidified slag, which permits recovery of the heat contained in the molten slag at a very high efficiency.

Further another object of the present invention is to provide an apparatus for manufacturing a rapidly cooled solidified slag, which permits continuous manufacture of the rapidly cooled solidified slag over a long period of time.

In accordance with one of the features of the present invention, there is provided an apparatus for manufacturing a rapidly cooled solidified slag, which comprises:

a pair of cooling drums each having the same diameter and the same length, the axial lines of said pair of cooling drums being arranged in parallel with each other in the same horizontal plane, the peripheral surfaces of said pair of cooling drums being in contact with each other;

a driving means for rotating said pair of cooling drums, said driving means being adapted to rotate said pair of cooling drums in directions opposite to each other at the same peripheral speed in the rising direction of the peripheral surface of each of said pair of cooling drums at the contact portion of said pair of cooling drums;

a pair of weirs provided at the both ends of said pair of cooling drums, said pair of weirs forming a slag sump in cooperation with the upper half of the peripheral surface of each of said pair of cooling drums;

a slag feeding means arranged above said pair of cooling drums, for pouring a molten slag into said slag sump;

a scraper provided so as to be in contact with the lower half of the peripheral surface of each of said pair of cooling drums;

a cooling medium for cooling said pair of cooling drums, said cooling medium being supplied into each of said pair of cooling drums through the center axle of each of said pair of cooling drums to cool same, said cooling medium exchanging heat with said molten slag in same slag sump, which has been deposited onto the peripheral surface of each of said pair of cooling drums, along with the rotation of each of said pair of cooling drums, and, said cooling medium which has exchanged heat with said molten slag being discharged through said center axle of each of said pair of cooling drums for heat recovery, whereby said molten slag deposited onto the peripheral surfaces of said pair of cooling drums is converted into a rapidly cooled solidified slag through heat exchange with said cooling medium and is then peeled off from the peripheral surfaces of said pair of cooling drums by means of said scraper, along with the rotation of said pair of cooling drums;

said apparatus being characterized in that:

the thickness of said molten slag which has been deposited onto the peripheral surfaces of said pair of cooling drums is reduced by a gas ejected from a pair of gas nozzles, each of said pair of gas nozzles being provided adjacent the peripheral surface of each of said pair of cooling drums at a location between the uppermost position of the peripheral surface of each of said pair of cooling drums and said slag sump, each of said pair of gas nozzles having a slit which has substantially the same length as the length of said cooling drums, said slit of each of said pair of gas nozzles being arranged horizontally and in parallel with the axial lines of said cooling drums, each of said pair of gas nozzles uniformly ejecting from said nozzle a gas onto said molten slag deposited on the peripheral surface of each of said pair of cooling drums to blow part of said molten slag deposited on the surface of each of said pair of cooling drums back into said slag sump, thereby uniformly reducing the thickness of said molten slag deposited on the peripheral surface of each of said pair of cooling drums.

DETAILED DESCRIPTION OF THE PREFERRED EMBODIMENTS

With a view to solving the above-mentioned problems involved in the conventional apparatus for manufacturing a rapidly cooled solidified slag, we carried out extensive studies, and as a result, we obtained the following finding:

It is possible to forcedly blow part of a molten slag deposited on the peripheral surface of each of the pair of cooling drums back into the slag sump by ejecting a gas to the molten slag which has been deposited on the peripheral surface of each of the pair of cooling drums along with the rotation thereof.

Therefore, the thickness of the molten slag deposited on the peripheral surface of each of the pair of cooling drums is reduced by the above-mentioned gas ejection from that before the gas ejection. Thus, the time required for completely solidifying the molten slag deposited on the peripheral surfaces of the pair of cooling drums, of which molten slag the thickness has been reduced, becomes shorter. By forcedly blowing part of the molten slag deposited on the peripheral surface of each of the pair of cooling drums back into the slag sump, the time required for completely solidifying the molten slag deposited on the peripheral surface can be drastically reduced. Since this allows large increase in the revolutions of the pair of cooling drums, it is possible to improve the productivity of the rapidly cooled solidified slag.

The present invention was developed on the basis of the above-mentioned finding, and the apparatus for manufacturing a rapidly cooled solidified slag of the present invention comprises:

a pair of cooling drums each having the same diameter and the same length, the axial lines of said pair of cooling drums being arranged in parallel with each other in the same horizontal plane, the peripheral surfaces of said pair of cooling drums being in contact with each other;

a driving means for rotating said pair of cooling drums, said driving means being adapted to rotate said pair of cooling drums in directions opposite to each other at the same peripheral speed in the rising direction of the peripheral surface of each of said pair of cooling drums at the contact portion of said pair of cooling drums;

a pair of weirs provided at the both ends of said pair of cooling drums, said pair of weirs forming a slag sump in cooperation with the upper half of the peripheral surface of each of said pair of cooling drums;

a slag feeding means arranged above said pair of cooling drums, for pouring a molten slag into said slag sump;

a scraper provided so as to be in contact with the lower half of the peripheral surface of each of said pair of cooling drums;

a cooling medium for cooling said pair of cooling drums, said cooling medium being supplied into each of said pair of cooling drums through the center axle of each of said pair of cooling drums to cool same, said cooling medium exchanging heat with said molten slag in said slag sump, which has been deposited onto the peripheral surface of each of said pair of cooling drums, along with the rotation of each of said pair of cooling drums, and, said cooling medium which has exchanged heat with said molten slag being discharged through said center axle of each of said pair of cooling drums for heat recovery, whereby said molten slag deposited onto the peripheral surfaces of said pair of cooling drums is converted into a rapidly cooled solidified slag through heat exchange with said cooling medium and is then peeled off from the peripheral surfaces of said pair of cooling drums by means of said scraper, along with the rotation of said pair of cooling drums;

said apparatus being characterized in that:

the thickness of said molten slag which has been deposited onto the peripheral surfaces of said pair of cooling drums is reduced by a gas ejected from a pair of gas nozzles, each of said pair of gas nozzles being provided adjacent the peripheral surface of each of said pair of cooling drums at a location between the uppermost position of the peripheral surface of each of said pair of cooling drums and said slag sump, each of said pair of gas nozzles having a slit which has substantially the same length as the length of said cooling drums, said slit of each of said pair of gas nozzles being arranged horizontally and in parallel with the axial lines of said cooling drums, each of said pair of gas nozzles uniformly ejecting from said nozzle a gas onto said molten slag deposited on the peripheral surface of each of said pair of cooling drums to blow part of said molten slag deposited on the surface of each of said pair of cooling drums back into said slag sump, thereby uniformly reducing the thickness of said molten slag deposited on the peripheral surface of each of said pair of cooling drums.

Now, the apparatus for manufacturing a rapidly cooled solidified slag of the present invention is described in detail with reference to the drawings.

Figure 2:
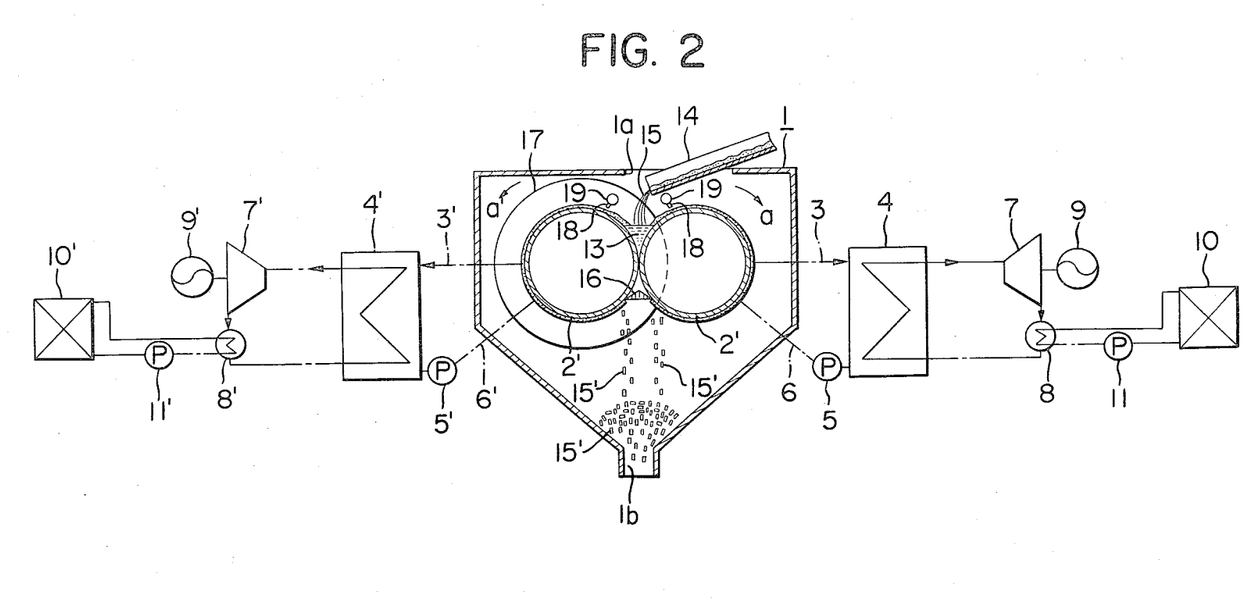
FIG. 2 is a schematic sectional view illustrating an embodiment of the apparatus for manufacturing a rapidly cooled solidified slag of the present invention.

FIG. 2 is a schematic sectional view illustrating an embodiment of the apparatus for manufacturing a rapidly cooled solidified slag of the present invention. As shown in FIG. 2, a pair of cooling drums 2' each having the same diameter and the same length are arranged in an enclosed-structure housing 1 so that the axial lines thereof are parallel to each other in the same horizontal plane and the peripheral surfaces thereof are in contact with each other. Each of the pair of cooling drums 2' is rotated by a suitable driving means not shown, in directions opposite to each other as shown by the arrows "a" and "a'" in FIG. 2 at the same peripheral speed in the rising direction of the peripheral surface of each of the pair of cooling drums 2' at the contact portion thereof. Each of a pair of weirs 17 having a hollow portion 17' and an annular shape is fixed to each of the ends of the peripheral surface of one of the pair of cooling drums 2' so as to be in contact with each of the ends of the peripheral surface of the other one of the pair of cooling drums 2'. Furthermore, each of the pair of weirs 17 is fixed to each of the ends of the peripheral surface of the above one of the cooling drums 2' so that a circular flange is formed at right angles to the axial line of the cooling drum 2' over the entire circumference thereof. Only one of the pair of weirs 17 is shown in FIG. 2.

As shown in FIG. 2, the pair of weirs 17 form a slag sump 13 in cooperation with the upper half of the peripheral surface of each of the pair of cooling drums 2'. The molten slag 15 discharged from the slag runner 14 is poured through the opening 1a of the housing 1 into the slag sump 13 where a slag pool is formed.

Figure 3:
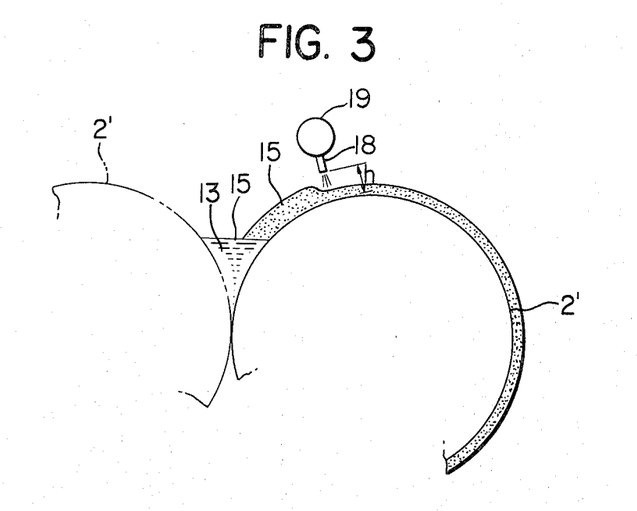
FIG. 3 is a descriptive view illustrating an embodiment of blowing-back of the molten slag deposited on the peripheral surfaces of the pair of cooling drums by means of gas nozzles of the present invention.

In FIG. 2, 18 is a pair of gas nozzles each of which has a slit for ejecting a gas and has substantially the same length as that of the cooling drums 2'. Each of the pair of gas nozzles is provided adjacent the peripheral surface of each of the pair of cooling drums 2' at a location between the uppermost position of the peripheral surface of each of the pair of cooling drums 2' and the slag sump 13. Each of the pair of gas nozzles 18 is supported on the housing by a suitable supporting means (not shown). Each of the pair of gas nozzles 18 is arranged horizontally so as to be in parallel with the axial line of the cooling drums 2'. Each of the pair of gas nozzles 18 uniformly ejects a gas from its slit to the molten slag 15 which has been deposited on the peripheral surface of each of the pair of cooling drums 2'. As a result, part of the molten slag 15 deposited on the peripheral surface of each of the pair of cooling drums 2' is blown back into the slag sump 13 by the ejection of gas from the slit of each of the pair of gas nozzles as shown in FIG. 3. Thus, the thickness of the molten slag 15 deposited on the peripheral surface of each of the pair of cooling drums 2' is uniformly reduced. As shown in FIG. 4, each of the pair of gas nozzles 18 has its slit extending along the longitudinal direction thereof. Each of the pair of gas nozzles 18 is fitted to the lower part of the periphery of each of a pair of nozzle pipes 19 having substantially the same length as the pair of cooling drums 2'. The nozzle pipe 19 has a known structure comprising an inner pipe 19a and an outer pipe 19b. The inner pipe 19a has at the top thereof a plurality of gas ejecting holes 19'a in the axial direction thereof. The gas is supplied from a suitable gas supply source (not shown) into the inner pipe 19a. The gas supplied into the inner pipe 19a is then supplied through the plurality of gas ejecting holes 19'a into the outer pipe 19b. The gas supplied into the outer pipe 19b is then supplied into the gas nozzle 18 fitted to the lower part of the outer pipe 19b. Thus, the gas nozzle 18 uniformly ejects the gas from its slit to the molten slag 15 deposited on the peripheral surface of the cooling drum 2'. As shown in FIG. 3, it is preferable to provide a distance h within a range of from 5 to 50 mm between the slit, i.e., the ejecting end of the gas nozzle 18 and the peripheral surface of the cooling drum 2'. The reason for this is as follows. With a distance h of under 5 mm, the molten slag 15 deposited on the peripheral surface of the cooling drum 2' tends to be deposited and accumulated on the ejecting end of the gas nozzle 18. With a distance h of over 50 mm, it is impossible to obtain a sufficient thickness-reducing effect of the molten slag deposited on the peripheral surface of the cooling drum 2' unless the pressure of the gas supplied into the gas nozzle 18 is increased to a very high level, and achievement of such a high pressure is not practical.

Figure 5:
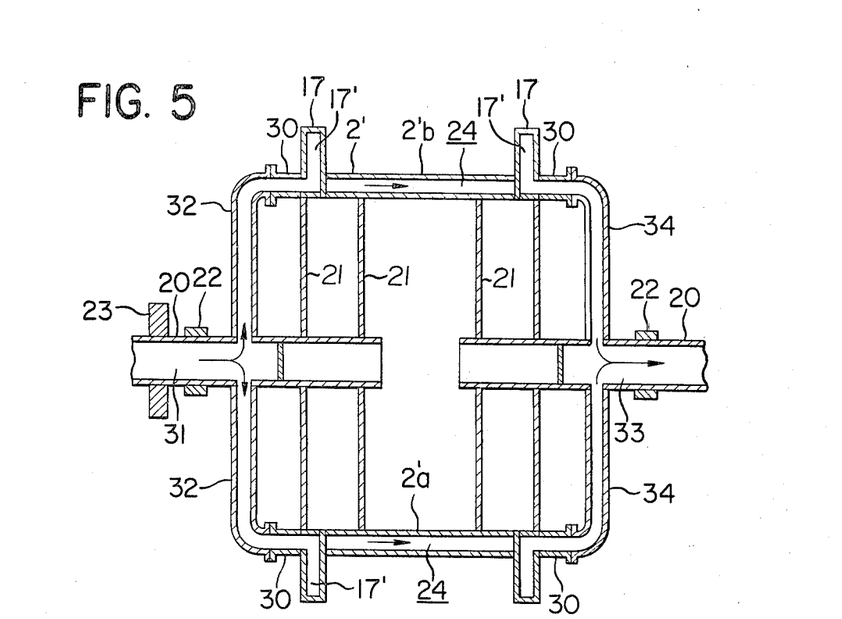
FIG. 5 is a longitudinal sectional view illustrating an embodiment of one of the pair of cooling drums, which has a pair of weirs of the present invention.
Figure 6:
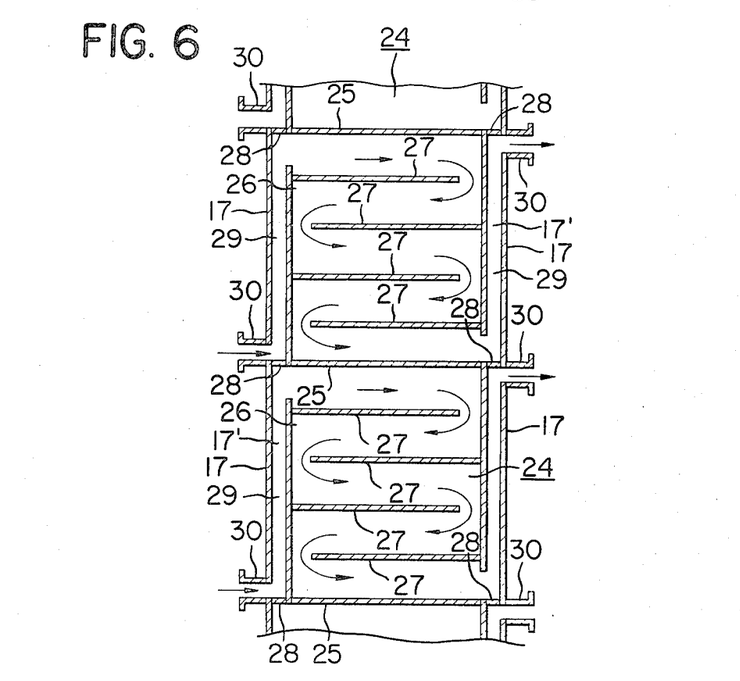
FIG. 6 is a partial development view illustrating an embodiment of one of the pair of cooling drums, which has a pair of weirs, of the present invention.
Figure 7:
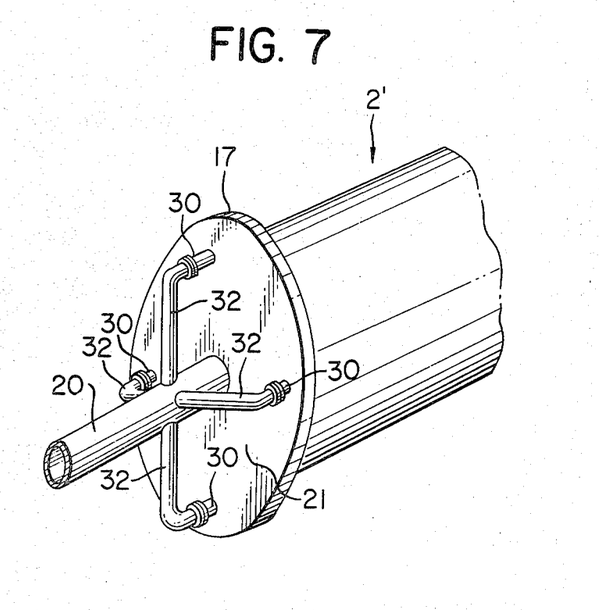
FIG. 7 is a partial perspective view illustrating an embodiment of one of the pair of cooling drums, which has a pair of weirs, of the present invention.

FIG. 5 is a sectional view of one of the pair of cooling drums 2'. FIG. 6 is a partial development view of one of the cooling drums 2'. FIG. 7 is a partial perspective view of one of the cooling drums 2'. In FIG. 5, 20 is a center axle of one of the cooling drums 2'; 21 is a supporting plate for fixing the center axle 20 along the axial line of one of the cooling drums 2'; 22 is a pair of bearing for supporting the center axle 20; and, 23 is a gear fixed to the center axle 20. The gear 23 is connected to a suitable driving means (not shown) for rotating one of the cooling drums 2'. As shown in FIG. 5, one cooling drum 2' comprises an inner cylindrical wall 2'a and an outer cylindrical wall 2'b concentric thereto, and the inner cylindrical wall 2'a and the outer cylindrical wall 2'b form a space 24 therebetween. As shown in FIG. 6, the hollow portion 17' of each of the pair of weirs 17 is divided into at least two independent compartments 29 by at least two partitions 28 provided at right angle to the circumferential direction of the hollow portion 17'.

As shown in FIG. 6, the space 24 in one cooling drum 2' is divided into at least two independent cells 26 by at least two diaphgragms 25 provided in parallel with the axial line of the cooling drum 2'. Each of the cells 26 communicates with each of the compartments 29 of the pair of weirs 17. In each of the cells 26, there is provided at least one current plate 27 in parallel with the axial line of the cooling drum 2'.

As shown in FIG. 5, each of at least two mouth pieces 30 is fitted to the outside of each of the pair of weirs 17 so as to communicate with each of at least two compartments 29. One end of each of a plurality of supply pipes 32 communicates with an interior 31 of one side of the center axle 20, and the other end of each of the plurality of supply pipes 32 communicates with each of the mouth pieces 30 of one of the pair of weirs 17. One end of each of a plurality of discharge pipes 34 communicates with the interior 33 of the other side of the center axle 20, and the other end of each of the plurality of discharge pipes 34 communicates with each of the mouth pieces 30 of the other one of the pair of weirs 17. One end of the center axle 20 liquid-tightly communicates through a swivel joint (not shown) with a pipe 6, and the other end of the center axle 20 liquid-tightly communicates through another swivel joint (not shown) with a pipe 3. Therefore, by the actuation of a pump 5, a cooling medium passes by meandering through the pipe 6, the interior 31 of one end side of the center axle 20, the supply pipe 32, the mouth piece 30, the compartment 29 of the weir 17 on one end side of one cooling drum 2', and along at least one current plate 27 in the cell 26 of the cooling drum 2'. Then, the cooling medium having passed through the cell 26 is supplied through the compartment 29 of the weir 17 on the other end side of the cooling drum 2', the mouth piece 30, the discharge pipe 34, the interior on the other end side of the center axle 20, and the pipe 3 into the heat absorbing section of the heat exchanger 4. Then, the cooling medium having been supplied into the heat absorbing section of the heat exchanger 4 is returned to the pipe 6. Thus, the cooling medium circulates through the cooling drum 2' and the heat exchanger 4, and thereby the cooling drum 2' and a pair of weirs 17 are cooled by the cooling medium.

Figure 8:
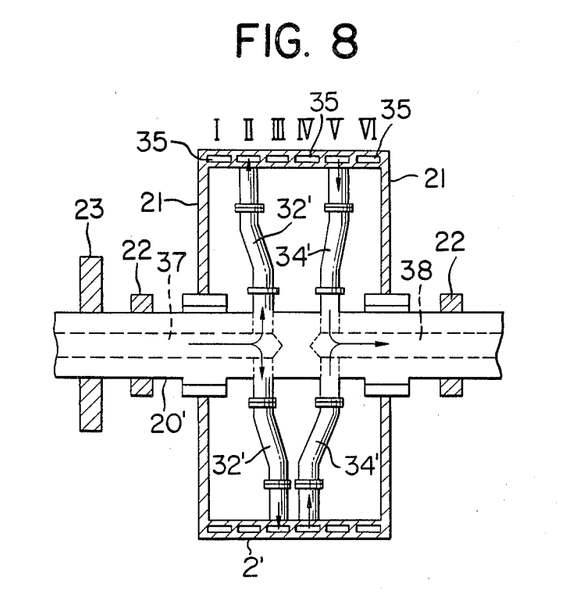
FIG. 8 is a longitudinal sectional view illustrating an embodiment of the other cooling drum of the present invention.
Figure 9:
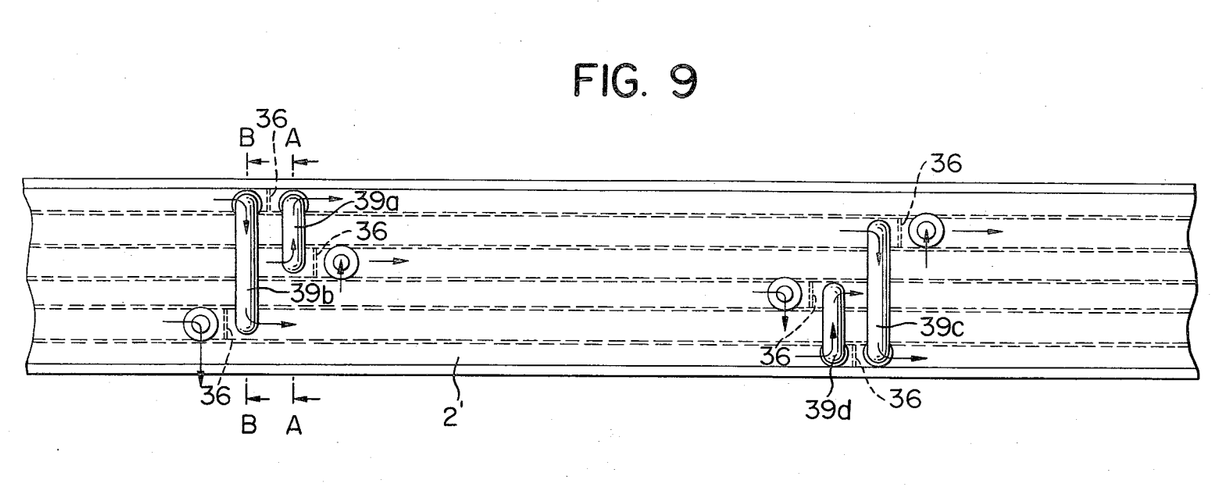
FIG. 9 is a partial development view illustrating an embodiment of the other cooling drum of the present invention.

FIG. 8 is a sectional view of the other one of the pair of cooling drum 2', and FIG. 9 is a partial development view of the other cooling drum 2'. As shown in FIG. 8, each of a pair of supporting plates 21 having a flat outside surface for fixing the center axle 20' on the axial line of the other one cooling drum 2' is fixed to each end of the other cooling drum 2' and the center axle 20'. Thus, the outside surface of each of the supporting plate 21 at each end of one cooling drum 2' is in contact with the inside surface of each of the weirs 17 at each end of the other cooling drum 2'.

Figure 10:
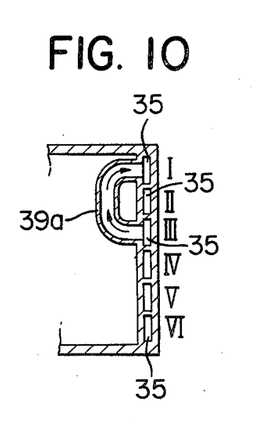
FIG. 10 is a sectional view cut along the line A—A of FIG. 9.
Figure 11:
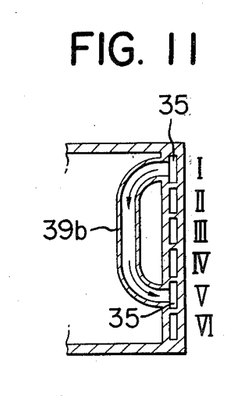
FIG. 11 is a sectional view cut along the line B—B of FIG. 9.

As shown in FIG. 8, the peripheral wall of the other cooling drum 2' has six annular hollow portions 35 each formed so as to form an annular shape along the circumferential direction thereof. As shown in FIG. 9, a stopper 36 is provided in each of the six annular hollow portions 35. One end of the center axle 20' of the other one cooling drum 2' liquid-tightly communicates through a swivel joint (not shown) with a pipe 6', and an end of each of two supply pipes 32' communicates with the interior 37 of one end side of the center axle 20'. One of the other ends of each of the two supply pipes 32' communicates with the third annular hollow portion 35 "III" at a position near the stopper 36, i.e., with one end of the third annular hollow portion 35 "III", and the remaining other end communicates with one end of the second annular hollow portion 35 "II". (In FIGS. 10 and 11, the position of the third annular hollow portion 35 is indicated by "III". The position of each of the six annular hollow portions 35 in the axial direction of the other cooling drum 2' is hereinafter represented by a number of from "I" to "VI".) One end of each of two discharge pipes 34' communicates with the interior 38 of the other end of the center axle 20'. One of the other ends of the two discharge pipes 34' communicates with one end of the fifth annnular hollow portion 35 "V", and the remaining other end communicates with one end of the fourth annular hollow portion 35 "IV". The other end of the center axle 20' liquid-tightly communicates through another swivel joint (not shown) with a pipe 3'. As shown in FIG. 10, the ends of a communicating pipe 39a communicate respectively with the other end of the third annular hollow portion 35 "III" and one end of the first annular hollow portion 35 "I". As shown in FIG. 11, the ends of another communicating pipe 39b communicate respectively with the other end of the first annular hollow portion 35 "I" and the other end of the fifth annular hollow portion 35 "V". As shown in FIG. 9, the ends of a communicating pipe 39c communicate respectively with the other end of the second annular hollow portion 35 "II" and one end of the sixth annular hollow portion 35 "VI", and the ends of a communicating pipe 39d communicate respectively with the other end of the sixth annular hollow portion 35 "VI" and the other end of the fourth annular hollow portion 35 "IV". Therefore, by the actuation of the pump 5', the cooling medium is supplied through the pipe 6', the interior 37 of one end side of the center axle 20', and one of the two supply pipes 32' to one end of the third annular hollow portion 35 "III". Then, the cooling medium passes through the third annular hollow portion 35 "III", and is supplied from the other end thereof through the communicating pipe 39a to one end of the first annular hollow portion 35 "I". Then, the cooling medium passes through the first annular hollow portion 35 "I", and is supplied from the other end thereof through the communicating pipe 39b to the other end of the fifth annular hollow portion 35 "V". Then, the cooling medium is supplied from one end of the fifth annular hollow portion 35 "V" through one of the two discharge pipes 34', the interior 38 of the other end side of the center axle 20' and the pipe 3' into the heat absorbing section of the heat exchanger 4'. Then, the cooling medium supplied into the heat absorbing section of the heat exchanger 4' is returned to the pipe 6'. In the same manner as mentioned above, by the actuation of the pump 5', the cooling medium is supplied through the pipe 6', the interior 37 of one end side of the center axle 20', the other supply pipe 32', the second annular hollow portion 35 "II", the communicating pipe 39c, the sixth annular hollow portion 35 "VI", the communicating pipe 39d, the fourth annular hollow portion 35 "IV", the other discharge pipe 34', the interior 38 of the other end side of the center axle 20', and the pipe 3', into the heat absorbing section of the heat exchanger 4'. Then, the cooling medium supplied into the heat absorbing section of the heat exchanger 4' is returned to the pipe 6'. Thus, the cooling medium circulates through the other cooling drum 2' and the heat exchanger 4', and thereby the other cooling drum 2' is cooled by the cooling medium.

By the apparatus for manufacturing a rapidly cooled solidified slag of the present invention having the construction as mentioned above, a rapidly cooled solidified slag is manufactured as follows. As shown in FIG. 2, the molten slag 15 poured from the slag runner 14 into the slag sump 13 is deposited on the peripheral surfaces of the cooling drums 2' during rotation thereof as represented in FIG. 3, and reaches the proximity of the gas nozzles 18 along with the rotation of the cooling drums 2'. The molten slag 15 deposited on the peripheral surfaces of the cooling drums 2' having reached the proximity of the gas nozzles 18 is partially blown by the gas ejected uniformly from the slits of the gas nozzles 18 back into the slag sump 13. The thickness of the molten slag 15 having thus been deposited on the peripheral surfaces of the cooling drums 2' during rotation thereof is uniformly reduced by the gas ejected from the slits of the gas nozzles 18. Then, the molten slag 15 deposited on the peripheral surfaces of the cooling drums 2' along with the rotation thereof, the thickness of which has been reduced, is rapidly cooled and solidified by the cooling medium flowing in the cooling drums 2' into a rapidly cooled solidified slag 15'. The rapidly cooled solidified slag 15' obtained on the peripheral surfaces of the cooling drums 2' is peeled off from the peripheral surfaces of the cooling drums 2' by the scraper 16 along with the rotation of the cooling drums 2', dropping in the form of small pieces into the lower part of the housing 1. The peripheral surfaces of the cooling drums 2' after peeloff of the rapidly cooled solidified slag 15' come again into contact with the molten slag 15 in the slag sump 13 along with the rotation of the cooling drums 2', and thus the rapidly cooled solidified slag 15' is continuously manufactured. Since the thickness of the molten slag 15 deposited on the peripheral surfaces of the cooling drums 2' is reduced by the gas ejected from the slits of the gas nozzles 18, the molten slag 15 deposited on the peripheral surfaces of the cooling drums 2' is very rapidly cooled and solidified. Therefore, the possibility of increasing the revolutions of the cooling drums 2' to a very high level permits manufacture of a rapidly cooled solidified slag at a high productivity. Because of the very rapid cooling and solidification of the molten slag deposited on the peripheral surfaces of the cooling drums 2', it is possible to manufacture a rapidly cooled solidified slag having a very high vitrification ratio, for example, by depositing a molten blast furnace slag onto the peripheral surfaces of the cooling drums 2'. The heat acquired by the cooling medium when the molten slag deposited on the peripheral surfaces of the pair of cooling drums 2' is rapidly cooled and solidified is recovered by the heat exchangers 4 and 4'. Since the thickness of the molten slag deposited on the peripheral surfaces of the cooling drums 2' is reduced by the gas ejected from the slits of the gas nozzles 18, it is possible to achieve a very high heat exchange efficiency between the molten slag 15 deposited on the peripheral surfaces of the cooling drums 2' and the cooling medium flowing in the cooling drums 2'.

EXAMPLE

A pair of cooling drums made of copper was prepared, having the construction as mentioned above with reference to FIG. 2, with an outside diameter of 2,000 mm and a length of 1,000 mm. Each of a pair of weirs 17 made of steel (SS41: JIS Standard) having a diameter of 3,200 mm and provided with hollow portions therein was fitted to each of the ends of one of the pair of cooling drums 2'. A high-boiling-point heat medium manufactured by Nippon Steel Chemical Co. Ltd. (brand name: "THERM S 600") was employed as the cooling medium. Gas nozzles 18 were installed so as to give a distance h between the slits, i.e., the ejecting ends of the gas nozzles and the peripheral surfaces of the cooling drums 2' of 20 mm.

In the apparatus of the present invention having the construction as mentioned in the above Example, each of the pair of cooling drums 2' was rotated in directions opposite to each other at revolutions of 10 r.p.m., and a molten blast furnace slag was poured from the slag runner 14 into the slag sump 13. Air was uniformly ejected from the slits of the gas nozzles 18 to the molten blast furnace slag deposited on the peripheral surfaces of the cooling drums 2'. As a result, the thickness of the molten blast furnace slag deposited on the peripheral surfaces of the cooling drums 2' was uniformly reduced from 4.0 to 2.0 mm, and the molten blast furnace slag was rapidly cooled and solidified into a rapidly cooled solidified slag by the cooling medium flowing in the cooling drums 2'. The rapidly cooled solidified slag thus formed was peeled off from the peripheral surfaces of the cooling drums 2' by the scraper 16. The cooling medium was taken out substantially under a pressure of 2 atm from the interior of the cooling drums 2', and was sent to the heat exchangers 4 and 4'. The rapidly cooled solidified slag thus obtained showed a vitrification ratio of 98.7%.

For comparison purposes, in the apparatus mentioned in the above Example, each of the pair of cooling drums 2' was rotated in directions opposite to each other at revolutions of 3 r.p.m. and a molten blast furnace slag was poured from the slag runner 14 into the slag sump 13. The molten blast furnace slag was deposited on the peripheral surfaces of the cooling drums 2' without ejecting air from the gas nozzles 18. As a result, the molten blast furnace slag was deposited into a thickness of 3.0 mm on the peripheral surfaces of the cooling drums 2'. The molten blast furnace slag deposited on the peripheral surfaces of the cooling drums 2' was rapidly cooled and solidified by the cooling medium flowing in the cooling drums 2' into a rapidly cooled solidified slag, and peeled off from the peripheral surfaces of the cooling drums 2' by the scraper 16. The rapidly cooled solidified slag thus obtained showed a vitrification ratio of 80%. In addition, in the above-mentioned apparatus of the Example, without the use of the gas nozzles, the cooling drums 2' was rotated at revolutions of over 2 r.p.m., and the molten blast furnace slag was poured into the slag sump 13 to deposit the molten slag onto the peripheral surfaces of the cooling drums 2'. As a result, a partially solidified slag containing portions not as yet solidified was peeled off from the peripheral surfaces of the cooling drums 2' and dropped into the lower part of the housing 1. The partially solidified slag having thus dropped into the lower part of the housing 1 was later solidified completely into a solidified slag. This solidified slag showed a very low vitrification ratio.

According to the apparatus for manufacturing a rapidly cooled solidified slag of the present invention, as described above in detail, the following industrially useful effects are provided:

(1) It is possible to continuously manufacture a rapidly cooled solidified slag at a very high productivity;

(2) It is possible to recover the heat contained in the molten slag at a very high efficiency;

(3) It is possible to continuously manufacture a rapidly cooled solidified slag over a long period of time; and, (4) It is possible to manufacture a rapidly cooled solidified slag having a very high vitrification ratio by rapidly cooling and solidifying a molten blast furnace slag.

What is claimed is:

1. An apparatus for manufacturing a rapidly cooled solidified slag, which comprises:

a pair of cooling drums each having the same diameter and the same length, the axial lines of said pair of cooling drums being arranged in parallel with each other in the same horizontal plane, the peripheral surfaces of said pair of cooling drums being in contact with each other;

a driving means for rotating said pair of cooling drums, said driving means being adapted to rotate said pair of cooling drums in directions opposite to each other at the same peripheral speed in the rising direction of the peripheral surface of each of said pair of cooling drums at the contact portion of said pair of cooling drums;

a pair of weirs provided at the both ends of said pair of cooling drums, said pair of weirs forming a slag sump in cooperation with the upper half of the peripheral surface of each of said pair of cooling drums;

a slag feeding means arranged above said pair of cooling drums, for pouring a molten slag into said slag sump;

a scraper provided so as to be in contact with the lower half of the peripheral surface of each of said pair of cooling drums;

a cooling medium for cooling said pair of cooling drums, said cooling medium being supplied into each of said pair of cooling drums through the center axle of each of said pair of cooling drums to cool same, said cooling medium exchanging heat with said molten slag in said slag sump, which has been deposited onto the peripheral surface of each of said pair of cooling drums, along with the rotation of each of said pair of cooling drums, and, said cooling medium which has exchanged heat with said molten slag being discharged through said center axle of each of said pair of cooling drums for heat recovery;

whereby said molten slag deposited onto the peripheral surfaces of said pair of cooling drums is converted into a rapidly cooled solidified slag through heat exchange with said cooling medium and is then peeled off from the peripheral surfaces of said pair of cooling drums by means of said scraper, along with the rotation of said pair of cooling drums;

a pair of gas nozzles for controlling the thickness of said molten slag which has been deposited onto the peripheral surfaces of said pair of cooling drums to a predetermined thickness, each of said pair of gas nozzles being provided adjacent to the peripheral surface of each of said pair of cooling drums at a location between the uppermost position of the peripheral surface of each of said pair of cooling drums and said slag sump, each of said pair of gas nozzles having a slit which has substantially the same length as the length of said cooling drums, said slit of each of said pair of gas nozzles being arranged horizontally and in parallel with the axial lines of said cooling drums, each of said pair of gas nozzles uniformly ejecting a gas onto said molten slag deposited on the peripheral surface of each of said pair of cooling drums to blow part of said molten slag deposited on the surface of each of said pair of cooling drums back into said slag sump, thereby uniformly reducing the thickness of said molten slag deposited on the peripheral surface of each of said pair of cooling drums; and each of said pair of weirs having an annular shape and having a hollow portion therein, each of said pair of weirs being fixed to each of the ends of the peripheral surface of one of said pair of cooling drums so that two circular flanges are formed around the entire circumference thereof at right angles to the axial line of said one cooling drum, said hollow portion of each of said pair of weirs communicating with the interior of said one cooling drum, and, said cooling medium passing through said hollow portion of each of said pair of weirs and said one cooling drum, thereby cooling said pair of weirs and said one cooling drum.

2. The apparatus of claim 1, wherein:

said hollow portion of each of said pair of weirs is divided into at least two independent compartments by at least two partitions provided at right angles to the circumferential direction; and, said one cooling drum having said pair of weirs comprises concentric inner and outer cylindrical walls, said inner and outer cylindrical walls forming a space therebetween, said space being divided into at least two independent cells by at least two diaphragms provided in parallel with the axial line of said one cooling drum, each of said independent cells communicating with each of said independent compartments of each of said pair of weirs, at least one current plate being provided in parallel with the axial line of said one cooling drum in each of said independent cells of said one cooling drum, and, said cooling medium passing independently through each of said independent compartments of each of said pair of weirs and meandering through said independent cells along said current plate, thereby cooling said pair of weirs and said one cooling drum.

3. The apparatus of claim 1 or 2, wherein:

the other one of said pair of cooling drums has a plurality of annular hollow portions in parallel with the circumferential direction thereof in the peripheral wall thereof, and, said cooling medium passes sequentially through said plurality of annular hollow portions, whereby said other one of said pair of cooling drums is cooled by said cooling medium 4. The apparatus of claim 1, wherein the slit of said gas nozzles is 5 to 50 mm from the peripheral surface of the cooling drum.

* * * * *